(12) United States Patent
Kurita et al.

(10) Patent No.: US 6,277,478 B1
(45) Date of Patent: Aug. 21, 2001

(54) CONTAINER CLOSURE SYSTEM WITH INNER SEAL IN CAP

(75) Inventors: Keigo Kurita, Ageo; Kiromi Soutome, Tochigi-Ken, both of (JP)

(73) Assignee: Taihei Paper Manufacturing (JP)

( * ) Notice: Subject to any disclaimer, the term of this patent is extended or adjusted under 35 U.S.C. 154(b) by 0 days.

(21) Appl. No.: 09/188,805

(22) Filed: Nov. 9, 1998

(30) Foreign Application Priority Data

Nov. 10, 1997 (JP) .................................................. 9-321991

(51) Int. Cl.[7] .................................................. B65D 41/00
(52) U.S. Cl. ...................... 428/200; 428/34.2; 428/35.7; 428/66.3; 428/66.4; 428/349; 428/461; 428/464; 428/513; 215/232; 215/341; 215/344; 215/347; 215/350
(58) Field of Search ................................. 428/35.7, 34.2, 428/66.3, 66.4, 458, 461, 464, 200, 513, 483, 349; 215/232, 341, 344, 347, 349, 300

(56) References Cited

U.S. PATENT DOCUMENTS

| | | | |
|---|---|---|---|
| 3,637,101 | * | 1/1972 | Risch et al. ........................... 215/347 |
| 4,505,399 | * | 3/1985 | Weiner ................................. 215/230 |
| 4,596,338 | * | 6/1986 | Yousif ................................. 215/232 |
| 4,684,554 | * | 8/1987 | Ou-Yang ............................... 215/349 |
| 4,772,650 | * | 9/1988 | Ou-Yang ............................... 524/271 |
| 4,778,698 | * | 10/1988 | Ou-Yang ............................... 215/232 |
| 4,893,718 | * | 1/1990 | Delespaul et al. ..................... 215/232 |
| 4,954,191 | * | 9/1990 | Delespaul et al. ..................... 215/232 |
| 5,637,396 | * | 6/1997 | Sato et al. ............................ 428/349 |
| 5,702,015 | * | 12/1997 | Giles et al. ........................... 215/232 |
| 5,712,042 | * | 1/1998 | Cain ................................... 215/347 |
| 5,915,577 | * | 6/1999 | Levine ................................ 215/232 |
| 6,082,566 | * | 7/2000 | Yousif et al. ......................... 215/232 |

FOREIGN PATENT DOCUMENTS

| | | |
|---|---|---|
| 5032540 | 9/1975 | (JP) . |
| 5748466 | 10/1982 | (JP) . |
| 5836685 | 8/1983 | (JP) . |
| 63 137756 | 9/1988 | (JP) . |
| 0323429 | 3/1991 | (JP) . |
| 0432958 | 3/1992 | (JP) . |
| 0472156 | 3/1992 | (JP) . |
| 52 147652 | 3/1992 | (JP) . |
| 072451 | 1/1995 | (JP) . |
| 072452 | 1/1995 | (JP) . |
| 072453 | 1/1995 | (JP) . |
| 0737268 | 4/1995 | (JP) . |

* cited by examiner

Primary Examiner—Rena L. Dye
(74) Attorney, Agent, or Firm—Dann, Dorfman, Herrell & Skillman, P.C.

(57) ABSTRACT

A container mouth (21) is sealed with an inner seal which comprises a reseal liner (9) fitted inside of a cap (23) and a seal cover (10) separably laminated to the reseal liner and remaining on the container mouth after the container (20) is uncapped. The seal cover comprises a metal foil (5), a glassine paper (7) layered on the underside of the metal foil, and a hot-melt adhesive layer (8) coated on the underside of the glassine paper by gravure roll coating process. A polyethlene film (6) is preferably layered between the metal foil and the glassine paper to provide a better peel-off strength therebetween. The glassine paper may be replaced with an easy-peelable plastic film, such as a PET (polyethylene terephthalate resin) film. The inner seal fitted in the cap is placed onto the container mouth, and then the cap is subjected to a high frequency of 20–600 KHz to melt the hot-melt adhesive layer, whereby the seal cover hermetically seals the container mouth. The seal cover separates from the reseal liner when the container is first decapped, and is relatively easy to be peeled off to open the container mouth.

4 Claims, 3 Drawing Sheets

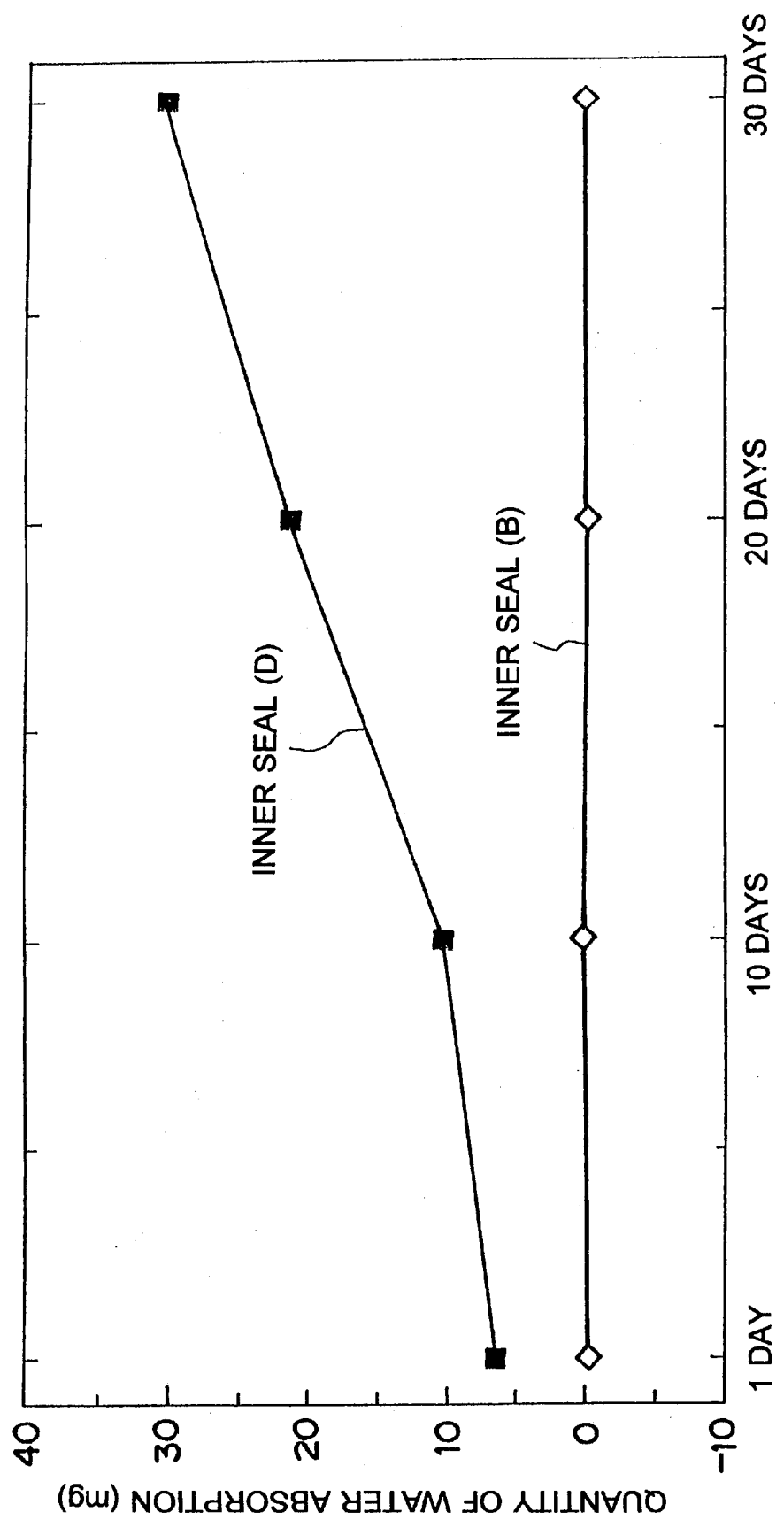

CONTAINER CLOSURE SYSTEM WITH INNER SEAL IN CAP

BACKGROUND OF THE INVENTION

1. Field of the Invention

The present invention relates to a container closure system with an inner seal in a cap. The inner seal of the present invention is useful for use in closures of a wide range of sizes and types of containers in glass, plastics, metal and paper.

2. Description of the Prior Art

Various attempts have been made to prevent contamination and deterioration of contents in containers. For example, house instant coffee, creaming powder, soup stock cube, powdery cosmetics, and any other product which is hygroscopic or sells on its factory fresh flavor must be contained in a completely hermetic container so that it is prevented from being deteriorated by contacting with an ambient air or humidity before actually used by the user. For this purpose, the inner seal, which is sometimes referred to as "wadding tape" or "cap insert", has been practically and widely used to hermetically seal the container mouth.

An example of the inner seal comprises a reseal liner of a relatively thick cardboard and a relatively thin paper-coated aluminum foil membrane that is easily separably laminated onto the reseal liner. The reseal liner is fitted within a cap whereas the membrane is glued or heat-sealed onto the container mouth. When the cap is removed from the container mouth, the membrane separates from the reseal liner and remains onto the container mouth, which is then peeled off so that the product in the container becomes accessible to the user. Even after the membrane has been removed, in-use protection of the product may be obtained by re-capping the container because the reseal liner within the cap will substantially hermetically seal the container mouth.

In accordance with the typical conventional sealing technique using the above-described inner seal, glue is applied to the rim of the container mouth and the container is capped in such a manner that glassine paper coated on the underside of the aluminum foil is placed over the glued rim, followed by natural cooling. Such conventional sealing technique is disclosed in Japanese Patent Publication Nos. 57-48466, 3-23429, 7-37268 and Japanese Utility-Model Publication Nos. 58-36685, 63-137756, for example.

However, it takes a long time, say. approximately one day, until glue on the rim is cured so as to completely close the container mouth, which means less productivity. Another disadvantage of this technique is that glue applied on the container mouth rim tends to be forced out to the inward or outward of the rim when capping. This is not only unattractive in commercial value but also unhygienic. When the container contains powdery product such as house instant coffee and powdery cosmetics, it would be attracted to and contaminated by the uncured glue remaining within the mouth of the container.

Recent trend of the sealing technique is to laminate thermoplastic resin film as the lowermost layer of the membrane. After capping, the cap is heated to a temperature above a melting point of the thermoplastic resin to provide hermetical closure to the container mouth. Such technique is disclosed in Japanese Utility-Model Publication No. 50-32540, 7-2451, 7-2452, 7-2453, Japanese Utility-Model Un-examined Publication Nos. 52-147652, 4-32958, Japanese Patent Un-examined Publication No. 4-72156, for example. The heat-sealing process in this technique is completed in a shorter period. However, the membrane is excessively strongly heat-sealed to the container mouth and, therefore, not easy to be peeled off by the user. Moreover, after the membrane is removed, at least a portion of the cured glue is deposited on the rim surface of the container mouth, which appears uncleanly and degrades reseal property when the container is capped with the cap having the reseal liner.

The inner seal is usually supplied in a continuous reel form in pre-determined widths on cardboard cores. The thermoplastic resin film used in the above-described conventional one has substantially a flat surface, which tends to result in a "blocking" when reeled.

SUMMARY OF THE INVENTION

Accordingly, it is a principal object of the present invention to overcome the drawbacks and disadvantages of the conventional container sealing techniques, and more particularly to provide a novel construction of a inner seal for a container that is capable of completely hermetically and hygienically sealing a mouth of the container and still is easy to be peeled off and provides a satisfactory in-use protection of the product in the container.

In accordance with an aspect of the present invention, there is provided an inner seal for sealing a container mouth, said inner seal comprising a reseal liner fitted inside of a cap and a seal cover separably laminated to the reseal liner and remaining on the container mouth after the container is uncapped, the seal cover comprising a metal foil, a glassine paper layered on the underside of the metal foil, and a hot-melt adhesive layer coated on the underside of the glassine paper by gravure roll coating process. The metal foil and the glassine paper may be laminated each other by wet- or dry-lamination process. In a preferable embodiment of the present invention, a polyethylene film is layered between the metal foil and the glassine paper to provide a better peel-off strength therebetween. The glassine paper may be replaced with an easy-peelable plastic film, particularly PET (polyethylene terephthalate resin).

The reseal liner of the inner seal of the present invention may be a conventional one and comprises, for example, a cardboard of 300–800 g/m$^2$ in density or a foamed plastic film.

The inner seal of the present invention is characterized by laminated construction of the seal cover comprising the metal foil, the glassine paper (or any other easy-peelable layer plastic film such as PET film) layered on the underside of the metal foil, and the hot-melt adhesive layer coated on the underside of the glassine paper by gravure roll coating process. The glassine paper is preferably of 15–60 g/m$^2$, which may be laminated on the metal foil such as an aluminum foil of 5.5–20 microns in thickness by interposing a polyethylene film therebetween. Then, a hot-melt adhesive is applied, in an amount of 10–50 g/m$^2$, to the underside of the glassine paper by gravure roll coating process, followed by drying, to form the hot-melt adhesive layer. Using the gravure roll coating process will assure that the hot-melt adhesive layer thus formed on the bottom of the glassine paper has a rugged surface which is latticed depending upon the mesh structure of rolls used in the gravure roll coating equipment. Accordingly, when the inner seal of the present invention is wound on a reel, there are only point-to-point contacts between the top surface and the rugged bottom surface of the hot-melt adhesive layer, which prevents "blocking" therebetween.

The hot-melt adhesive is a mixture of an adhesive agent, ethylene-vinyl acetate copolymer (EVA) and a wax in a predetermined ratio, which is admixed in a known oven with rotary vanes. Wax decreases viscosity of the hot-melt adhesive to the order of 2000 cps at a temperature of 150 degrees in Centigrade. The hot-melt adhesive of the present invention has a melfing point ranging 65–140 degrees in Centigrade.

The upper surface of the metal or aluminum foil may be decorated as desired to increase appearance and commercial values of the inner seal. Such decoration may be printing of a company's logo, trade name or trademark of the product, any message or description that should be known to the user before the seal cover is removed from the container mouth. On a decorated or undecorated upper surface of the metal foil is coated a coating layer of peelable, hygienic material.

Thus, the seal cover of the inner seal of the present invention is prepared, and is laminated onto the bottom of the reseal liner to prepare the inner seal in accordance with the present invention. Of course, the inner seal should be cut into a predetermined shape and size for fitting in a cap. Since the seal cover is softly, that is, easily peelably laminated to the reseal liner, when the cap with this inner seal fitted therein is uncapped from the container, the seal cover will separated from the reseal liner so that the former remains to be hermetically attached to the container mouth, leaving the latter in the cap. Then, the seal cover is removed to open the container mouth. The seal cover will peel easily and cleanly away from the container mouth because the rugged bottom surface of the hot-melt adhesive layer provides point-to-point contact with the rim surface of the container mouth. No adhesive residue remains on the rim surface of the container mouth after removing the seal cover.

In accordance with another aspect of the present invention, there is provided a process of sealing a container mouth comprising the steps of fitting within a cap an inner seal comprising a reseal liner and a seal cover separably laminated to the reseal liner, the seal cover comprising a metal foil, a glassine paper layered on the underside of the metal foil, and a hot-melt adhesive layer coated by gravure rolls on the underside of the glassine paper, subjecting the inner seal to high frequency of 20–600 KHz to melt the hot-melt adhesive layer, whereby the seal cover hermetically seals the container mouth. This process will facilitate the container mouth to be completely hermetically sealed in a very short period of time. The gravure roll coating method will allow the high frequency sealing to be applied at a relatively low temperature, for example at approximately 100 degrees in Centigrade, which of course decrease power consumption and provides cost reduction.

When the user removes the seal cover that still hermetically seals the container mouth after separating from the reseal liner, the seal cover tends to be destroyed within a layer of the glassine paper. More particularly, the hot-melt adhesive agent coated on the bottom of the glassine paper is melt during the high frequency sealing process so that a portion of the molten adhesive is immersed into a bottom portion of the glassine paper, then cured thereat. In other words, the bottom portion of the glassine paper is resined with the adhesive. Accordingly, when removing the seal cover, the resined bottom portion of the glassine paper and the adhesive layer still remain on the rim surface of the container mouth, while the remaining, unresined upper portion of the glassine paper is removed together with the metal foil. If the PE film is interposed between the glassine paper and the metal foil, it is of course removed as well. When the glassine paper is replaced with PET film or any other easy-peelable plastic film, the plastic film tends to be completely removed together with the upper layers of the seal cover, since the adhesive will not immerse into the plastic film to provide less adhesive strength therebetween. In this case, only the cured adhesive layer remains deposited on the rim surface of the container mouth, after removing the seal cover. In any embodiment, the inner seal of the present invention provides completely hermetical sealing capability to the container mouth but is still easy to be peel off by the user. The initial hermetical sealing efficiency will be long-lasting, even in temperature and moisture changes, until the cap is unscrewed. The in-use reseal efficiency is also satisfactory because the reseal liner provides a planar contact with a substantially flat upper surface of the residue on the container mouth after the seal cover is removed.

As the metal foil of the seal cover, the use of an aluminum foil of 5.5–20 microns in thickness is preferable because it may prevent an injury which the user could otherwise suffer to his or her fingers when removing the seal cover. The seal cover including such a thin aluminum foil is easy to be incinerated, which causes no environmental disruption and provides great cost reduction in waste treatment. When such a thin metal foil is used, it is practically preferable to seal the inner seal to the container mouth with a relatively high frequency of more than 200 KHz, for example.

BRIEF DESCRIPTION OF THE DRAWINGS

Other objects and advantages of the present invention can be understood from the following description when read in conjunction with the accompanying drawings in which:

FIG. 4 is a graph showing the time-relational change of hermetical property of a glass container that is sealed in accordance with an embodiment of the present invention, in comparison with that of a conventional glued glass container.

DETAILED DESCRIPTION OF THE PREFERRED EMBODIMENT

Figure 1:
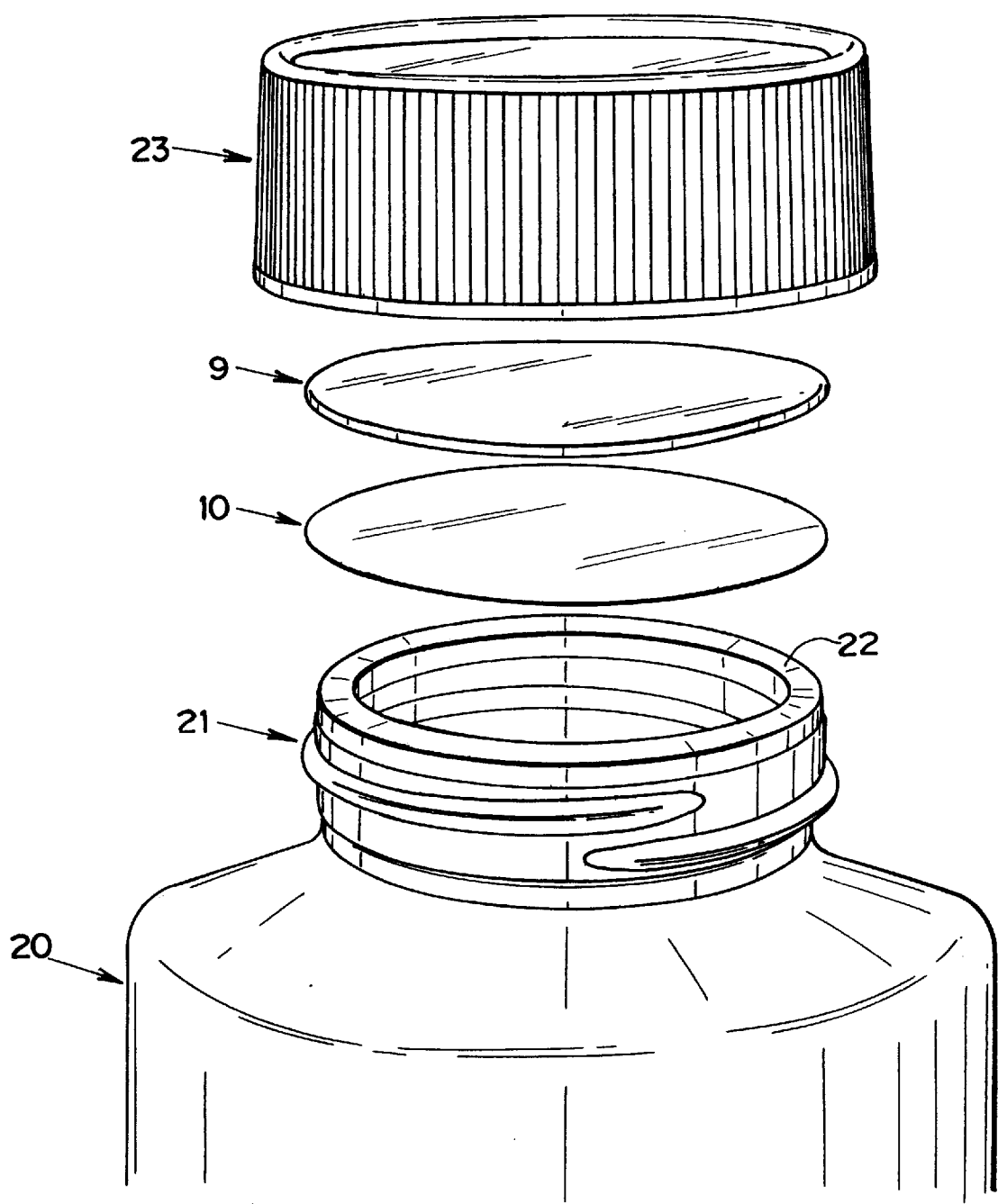
FIG. 1 is a perspective fragmentary view of an inner seal of the present invention when used in a molded screw cap of a container.
Figure 2:
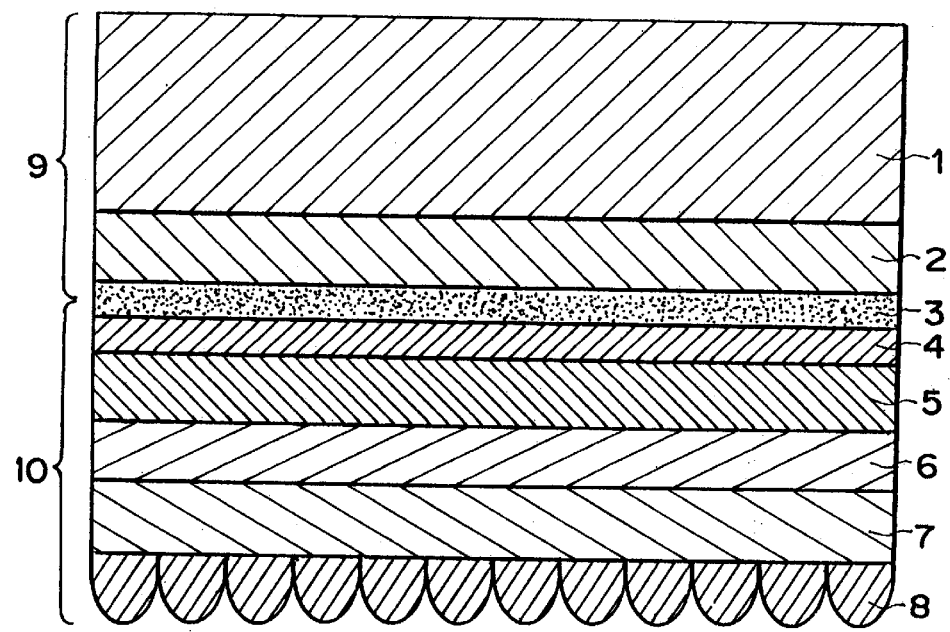
FIG. 2 is a diagrammatic section view of the inner seal in accordance with a preferable embodiment of the present invention.

An aluminum foil of 9 micron thickness was laminated on a glassine paper of 30.5 g/m$^2$ with a polyethylene film of 15 micron thickness located therebetween to prepare a composite sheet. The aluminum surface was printed and then coated by gravure rolls with an easy-peelable, hygienic material, whereas the glassine paper surface was coated by gravure rolls with a hot-melt adhesive. To the printed and coated aluminum surface is laminated a cardboard of 450 g/m$^2$ via a polyethylene film of 60 micron thickness, thereby preparing an inner seal (A) embodying the present invention. Referring now to FIG. 1 and FIG. 2, this inner seal (A) has multi-layer construction comprising a cardboard 1, a PE film 2, a peelable layer 3, a print layer 4, an aluminum foil 5, a PE film 6, a glassine paper 7 and a gravure-coated hot-melt adhesive layer 8. A reseal liner 9 consists of cardboard 1 and PE film 2, which remains in a molded screw cap 23 when the cap is removed from the container. A seal cover 10 which hermetically seals a rim surface 22 of a mouth 21 of a bottle or container 20 consists of print layer 4, aluminum foil 5, PE film 6, glassine paper 7 and adhesive layer 8. Reseal liner 9 is easily pealably laminated on seal cover 10 by peelable layer 3 which allows reseal liner 9 to separate from seal cover 10 when cap 23 is unscrewed.

Another inner seal (B) was prepared in the same manner as stated above except that glassine paper 7 was replaced by a PET film of 12 micron thickness.

As a control example, an inner seal (C) was prepared which comprises a cardboard of 450 g/m$^2$, 60 micron thick PE film, an easy-pee!able, hygienic material, a print layer, 30 micron thick aluminum foil, 30 micron thick PE film and a sealant layer. This inner seal (C) differs from the inner seals (A) and (B) in that (1) it does not use the glassine paper nor the PET film; (2) it has the sealant layer; and (3) the aluminum foil has 30 micron thickness as in the conventional inner seals.

Molded screw cap 23 provided with these inner seals (A), (B) and (C) were respectively capped on mouth 21 of 70 mm diameter of glass bottle 20 containing 250 g creaming powder. Then, the respective caps were subjected to high frequency sealing process with 450 KHz at a sealing speed of 200 caps per minute, so that each of the inner seals hermetically covers rim surface 22 of bottle mouth 21. Immediately after sealing, cap 23 was unscrewed and the initial peel-off strength was measured for each seal cover 10 which had been separated from reseal liner 9. The respective bottles were preserved in an atmosphere of 40 degrees in Centigrade and 90% moisture and the peel-off strength after 1 week and 2 weeks were also measured. The results of these measurements are shown in the following Table I.

TABLE I

| | PEEL-OFF STRENGTH | | |
|---|---|---|---|
| | INITIAL | AFTER 1 WEEK | AFTER 2 WEEKS |
| INNER SEAL (A) | 600 g/15 mm | 500 g/15 mm | 500 g/15 mm |
| INNER SEAL (B) | 550 g/15 mm | 500 g/15 mm | 500 g/15 mm |
| INNER SEAL (C) | 1200 g/15 mm | 1100 g/15 mm | 1100 g/15 mm |

Figure 3:
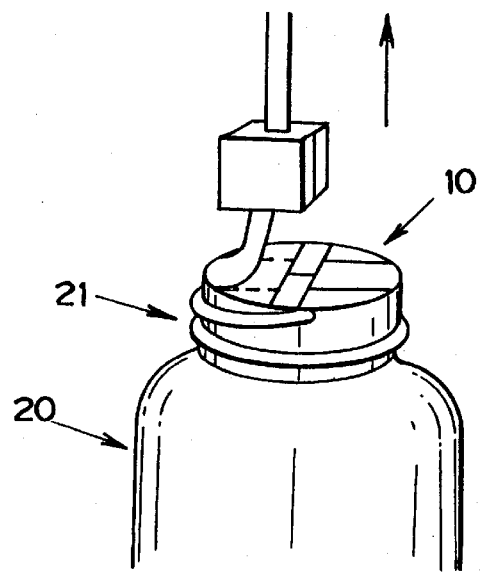
FIG. 3 is a diagrammatic view showing the manner of measurement of peel-off strength of the seal cover after it separates from the reseal liner and remains above the mouth of a glass container.

The peel-off strength was measured with an Instron-type tension test machine. More specifically, the top of the seal cover was slit at 15 mm intervals and one piece was pulled upright, as shown in FIG. 3. The tensile strength necessary to remove the piece was measured as the peel-off strength.

As apparent from the results shown in Table I, it can be confirmed that both of the inner seals (A) and (B) are easy to be peeled off when compared with the inner seal (C). The reason why peelability of the inner seal (C) is not satisfactory is because the lowermost sealant layer is unseparably adhered to the PE film. Moreover, when peeling the seal cover of the inner seal (C), the user's finger may be injured by the cut end of 30 micron thick aluminum foil, which has been used in general in the conventional inner seals but is replaced by a thinner one in the inner seal of the present invention.

Another control example (D) was prepared by removing the lowermost hot-melt adhesive layer 8 from the inner seal (B). The inner seal (B) was heat-sealed with 450 KHz high frequency to a mouth of a glass bottle containing anhydrous calcium chloride, whereas the inner seal (D) was glued onto the same glass bottle mouth. The graph in FIG. 4 shows the water quantity absorbed to the anhydrous calcium chloride contained in the bottle sealed by the inner seals (B) and (D). As shown, the quantity of water absorption increased with time when the bottle is sealed by the conventional inner seal (D). On the contrary, there was no remarkable change of the water absorption in the bottle sealed by the inner seal (B) of the present invention, which means that this inner seal (B) has an improved hermetical property over a long period of time.

In accordance with the teachings of the present invention, the inner seal is not glued but heat-sealed to a container mouth. The heat-sealing process is completed in a quite short period, and the container may be moved to anywhere immediately after it is sealed. The product in the container is not attracted to the uncured glue or adhesive, which maintain good appearance of the container. The sealing strength and hermetical property of the container in accordance to the present invention will be substantially everlasting so that deterioration of the product therein is perfectly prevented for much longer period. Accordingly, the container which is sealed in accordance with the present invention is particularly suitable for use as a container for a product which tends to deteriorate by oxidation or is hygroscopic.

The container produced by the present invention's closure technology provides a hermetical property which is sufficient to remain a factory fresh flavor and quality of the product in the sealed container, still has an improved easy-peelability when removing a seal cover from the container mouth, This is because the glassine paper is relatively easy to be teared off along its planar fiber orientation. When the glassine paper is replaced by PET film or any other plastic film, this film is laminated on the hot-melt adhesive layer with a peel-off strength which is much smaller than that between the adhesive layer and the rim surface of the container mouth, so that the seal cover can be easily removed, leaving the adhesive layer on the rim surface.

Although the present invention has been described in connection with a specific embodiment thereof, it should be understood that the present invention has various modifications and variations within a scope of invention that is defined in the appended claims.

What is claimed is:

1. An inner seal for sealing a container mouth, said inner seal comprising a reseal liner fitted inside of a cap and a seal cover separably laminated to said reseal liner and remaining on the container mouth after the container is uncapped, said seal cover comprising a metal foil, a glassine paper layered on the underside of said metal foil, and a hot-melt adhesive layer coated on the underside of said glassine paper by gravure roll coating process positioned to seal against the container mouth.

2. An inner seal according to claim 1 wherein a polyethlene film is layered between said foil and said glassine paper.

3. An inner seal according to claim 1 wherein said metal foil is an aluminum foil of 5.5–20 micron thickness.

4. An inner seal for sealing a container mouth, said inner seal comprising a reseal liner fitted inside of a cap and a seal cover separably laminated to said reseal liner and remaining on the container mouth after the container is uncapped, said seal cover comprising a metal foil, a polyethlene film layered on the underside of said metal foil, a plastic film layered on the underside of the polyethlene film, and a hot-melt adhesive layer coated on the underside of said plastic film by gravure roll coating process positioned to seal against the container mouth.

\* \* \* \* \*